US012384070B2

(12) United States Patent
Harris et al.

(10) Patent No.: US 12,384,070 B2
(45) Date of Patent: Aug. 12, 2025

(54) SETTING KEY FOR PLANE IRON IN TENON TAPERING PLANE

(71) Applicants: Kelly Harris, Brooklyn, NY (US); Peter Galbert, Rollinsford, NH (US)

(72) Inventors: Kelly Harris, Brooklyn, NY (US); Peter Galbert, Rollinsford, NH (US)

(73) Assignee: Kelly Harris, Brooklyn, NY (US)

(*) Notice: Subject to any disclaimer, the term of this patent is extended or adjusted under 35 U.S.C. 154(b) by 411 days.

(21) Appl. No.: 18/171,813

(22) Filed: Feb. 21, 2023

(65) Prior Publication Data

US 2024/0278453 A1 Aug. 22, 2024

(51) Int. Cl.
*B27G 23/00* (2006.01)

(52) U.S. Cl.
CPC .................................... *B27G 23/00* (2013.01)

(58) Field of Classification Search
CPC ......... B27G 23/00; B27G 17/025; B27M 3/28
See application file for complete search history.

(56) References Cited

U.S. PATENT DOCUMENTS

| | | | | |
|---|---|---|---|---|
| 5,503,200 A * | 4/1996 | Lea | B27M 3/28 142/38 |
| 6,263,929 B1 * | 7/2001 | Aziz | B27C 5/08 142/29 |
| 7,569,760 B2 * | 8/2009 | Vochezer | B27M 3/28 84/274 |
| 9,682,492 B1 * | 6/2017 | Schaffter | B23Q 17/2233 |

* cited by examiner

*Primary Examiner* — Matthew Katcoff

(57) ABSTRACT

A setting key for attaching a plane iron to a tapering plane at a specific desired tapering angle, the setting key comprising: a first edge shaped to fit into a setting key function slot with an opening along a circumference of a mortise of the tapering plane; and a second edge positioned opposite to the first edge, wherein when the setting key is inserted into the setting key function slot: the first edge is nested in the setting key function slot, and the second edge protrudes into and radially bisects the mortise of the tapering plane, such that the second edge provides a surface spaced from the mortise edge and positioned at an orientation that differs from a mortise longitudinal axis by the specific desired tapering angle to hold the plane iron so that it is configured to be attached to the tapering plane at the specific desired tapering angle.

19 Claims, 4 Drawing Sheets

SETTING KEY FOR PLANE IRON IN TENON TAPERING PLANE

BACKGROUND OF THE INVENTION

Mortise and tenon joints are a strong and structurally sound form of wood joinery commonly used in applications such as furniture making, cabinetry, and timber framing. Round and tapered mortise and tenon joints have a locking geometry that gets stronger with use, lends itself to wedged-through joinery, and offers ease of assembly.

A "tapering plane," also known as a "tenon cutter" or "rounding plane," is used to shape and smooth the joint end of an elongated wooden round into a tenon with the proper angle to fit into the matching angle and dimension of a mortise. A complementary mortise is shaped by a reamer. The tapering plane shapes the tenon to taper at a specific angle to fit the correspondingly angled mortise. This angle of the mortise and tenon is, for example, six degrees but can range anywhere between 0-20 or more degrees.

Over time, the cutting blade for planing the tenon, also called a "plane iron" dulls with use. Periodically, it should be removed and sharpened.

When replacing the plane iron, however, its attachment angle to the tapering plane is difficult to reset as it should attach at almost exactly the specific tapering angle. Even a slight deviation from this angle can cause the mortise and tenon not to fit, which results in a weak or failing joint.

In addition, conventional tenon cutters have a width and therefore cutting blade length shorter than many tenons, and because the plane iron cannot be accurately reset along the same tenon cutter, multiple different tenon cutters with different varying blade depths are used along the length of the elongated wooden round. This provides a cumbersome and inefficient way to taper longer tenons.

There is therefore a longstanding need in the art for an easy and sufficiently accurate way to reattach the plane iron to the tapering plane at the desired tapering angle.

SUMMARY OF THE INVENTION

Embodiments of the invention overcome this longstanding need in the art by providing a removable setting key for attaching a plane iron to a tapering plane at a specific desired tapering angle. The setting key comprises a first edge shaped to fit into a setting key function slot with an opening along a circumference of a mortise of the tapering plane, and a second edge positioned opposite to the first edge. When the setting key is inserted into the setting key function slot, the first edge is nested in the setting key function slot, and the second edge protrudes into and radially bisects the mortise of the tapering plane. In this configuration, the second edge provides a surface spaced from the mortise edge and positioned at an orientation that differs from a longitudinal axis of the mortise by the specific desired tapering angle to hold the plane iron so that it is configured to be attached to the tapering plane at the specific desired tapering angle. A wooden round may be inserted through the mortise, and the tapering plane rotated to shape the round into a tenon with the desired tapering angle. Because the plane iron is mounted at the desired tapering angle askew from the mortise (and tenon's) common longitudinal axis, when the tapering plane is rotated perpendicular to the tenon, the plane iron shapes and smooths the surface of the tenon at that desired tapering angle.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGURE NUMBERING KEY

Figure 1:
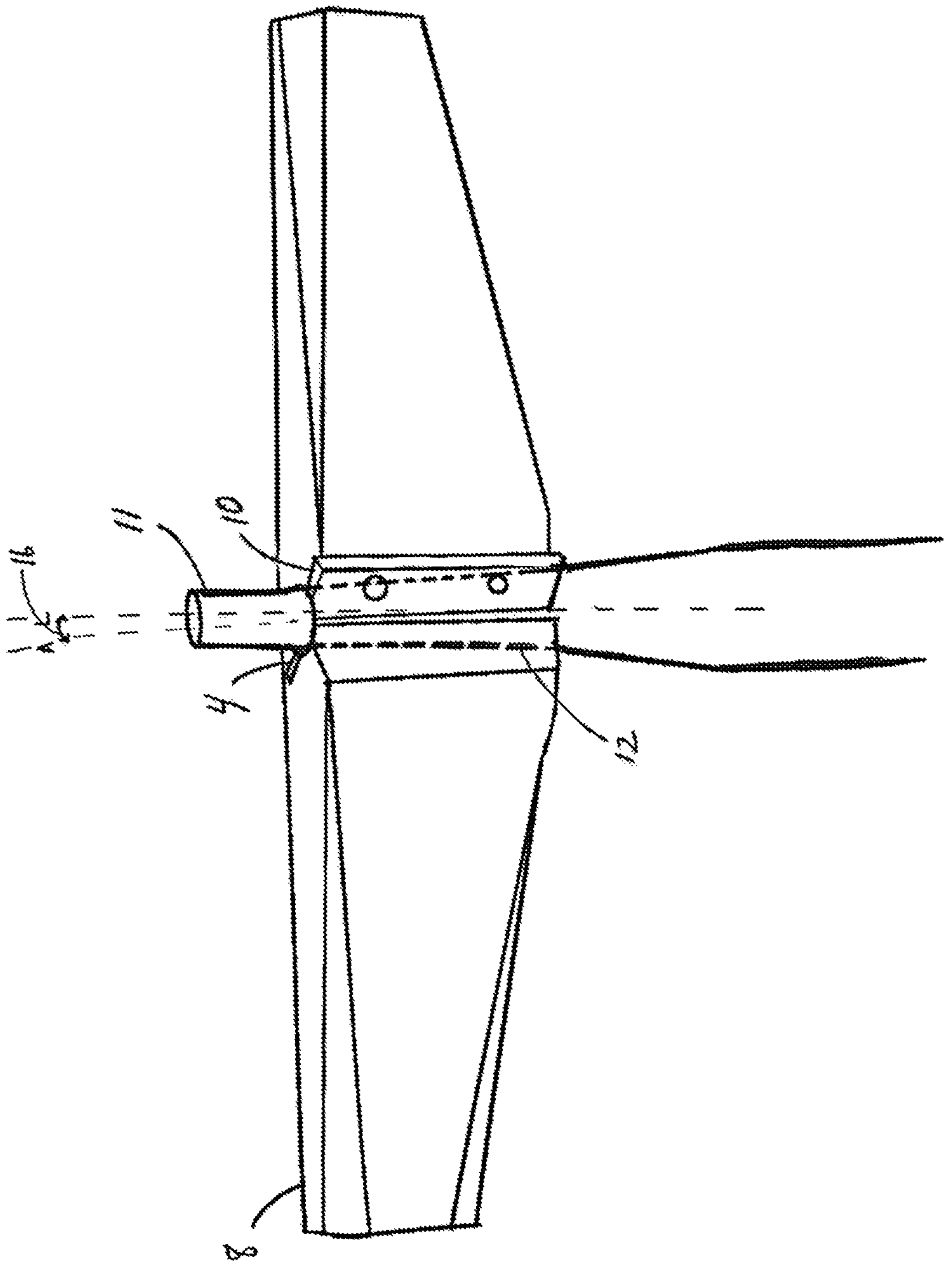
FIG. 1 is a schematic illustration of a tapering plane 8 configured to shape tenons 11, in accordance with some embodiments of the invention.

- 2: Setting Key
- 4: Setting key function slot
- 6: Setting key storage slot
- 8: Tapering plane
- 10: Plane iron
- 11: Tenon
- 12: Mortise
- 14: Depth of cut adjuster
- 16: Plane iron attachment tapering angle
- 18: Setting key removal tab
- 20: Notch It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Reference is made to FIG. 1, which schematically illustrates a tapering plane 8 configured to shape and smooth the surface of a tenon 11, in accordance with some embodiments of the invention. Tapering plane 8 has a mortise 12 centered along a longitudinal axis L. Mortise 12 is a recessed joint end shaped to fit the complementary shaped protruding joint end of tenon 11. A plane iron 10 is a cutting blade for planing wood that is removably mounted to tapering plane 8 along a blade tapering axis A. Plane iron 10 may be removably mounted by screws, clips, or any other attachment means.

An uncut tenon 11 (e.g., an elongated wooden round) may be passed through mortise 12 along longitudinal axis L. Tapering plane 8 may be rotated perpendicular to longitudinal axis L to cut, shape and smooth tenon 11. Because plane iron 8 is mounted at blade tapering axis A, plane iron 10 shapes tenon 11 at a tapering angle 16 that is the angle by which plane iron's tapering axis A deviates from the mortise and tenon's common longitudinal axis L. To accurately shape tenon 11, plane iron 10 should be accurately mounted or remounted (for example, to sharpen the plane iron blade or incrementally shifting the mounting blade depth for shaping along the length of a wood round) to tapering plane 8 along a blade tapering axis A.

Figure 2:
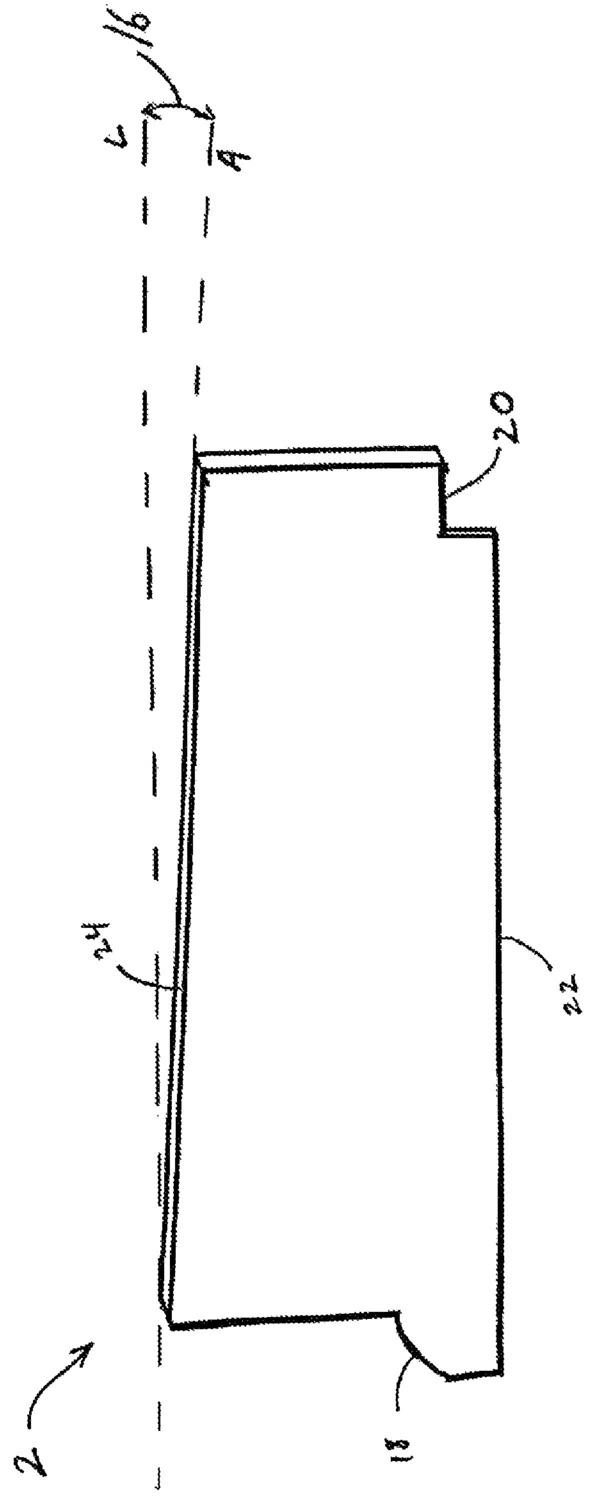
FIG. 2 is a schematic illustration of a setting key 2, in accordance with some embodiments of the invention.

Reference is made to FIG. 2, which schematically illustrates a setting key 2, in accordance with some embodiments of the invention. Setting key 2 is used to accurately set plane iron 10 to mount along blade tapering axis A and thus cut tenon 11 at desired tapering angle 16. Setting key 2 may have two opposite edges 22 and 24. Setting key 2 may be composed of a material substantially rigid enough to prevent wearing by plane iron 10, such as, metal, hard wood, hard plastic or any combination thereof, such as, a hard plastic body with a metal layered edge 24.

Figure 3:
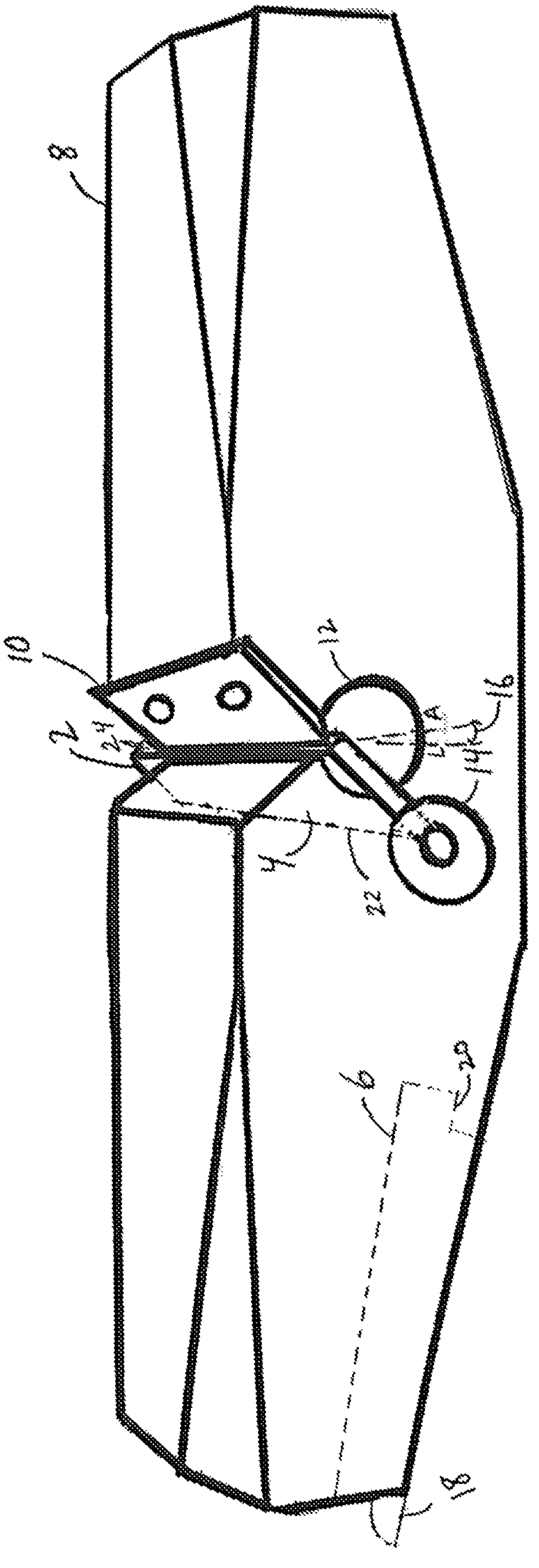
FIG. 3 is a schematic illustration of a tapering plane 8 with a setting key 2, in accordance with some embodiments of the invention.

Reference is made to FIG. 3, which schematically illustrates a tapering plane 8 with a setting key 2, in accordance with some embodiments of the invention. Setting key 2 is shaped to fit into a setting key function slot 4 with edge 22 nested in slot 4 and opposing edge 24 protruding out of slot 4 into mortise 11 of tapering plane 8. Protruding edge 24 of setting key 2 spaces plane iron 10 to attach to tapering plane 8 at a properly tuned depth and tapering angle for tapering (or straightening for a straight tenon) mortise 11. When setting key 2 is inserted into setting key function slot 4, protruding edge 24 is non-parallel to mortise longitudinal axis L, angled along tapering axis A to mount at a desired tapering angle 16. Protruding edge 24 thus provides a mounting surface for attaching plane iron 10 at the desired tapering angle 16. Desired tapering angle 16 provides a graduated width for spacing and mounting plane iron 10 to protrude into mortise 11 at the desired depth graduated along the blade edge.

The mounting tapering axis A of setting key's 2 protruding edge 24 may be implemented according to various configurations. In one configuration, function slot edge 22 and protruding edge 24 are parallel, but setting key function slot 4 is inclined non-parallel to mortise longitudinal axis L along tapering angle A. So, when setting key 2 is inserted into setting key function slot 4, protruding edge 24 is angled from mortise longitudinal axis L at the desired tapering angle 16. In another configuration, e.g., as shown in FIG. 2, function slot edge 22 and protruding edge 24 are non-parallel, differing by the desired tapering angle 16, so when setting key 2 is inserted into setting key function slot 4, function slot edge 22 aligns parallel to the longitudinal center axis L of mortise 11, and protruding edge 24 is angled from mortise longitudinal axis L at the desired tapering angle 16. In another configuration, edges 22 and 24 as well as setting key function slot 4 are non-parallel to the longitudinal center axis L of mortise 11, each providing a partial angle therefrom which when combined causes protruding edge 24 to angle from mortise longitudinal axis L at the desired tapering angle 16.

In some embodiments, the setting key position in the mortise is adjustable by a depth of cut adjuster 14 to tune the depth of the setting slot, and in turn, the depth at which the plane iron 10 protrudes to cut tenon 11. In one embodiments, depth of cut adjuster 14 slides setting key 2 in a direction parallel to longitudinal axis L of mortise 11 tapering angle A (e.g., to achieve desired tapering angle 16 depending on the angle between edges 22 and 24). Because setting key edge 24 protrudes into mortise 12 at desired tapering angle 16, when setting key 2 slides (e.g., laterally along tapering plane 8, such as, parallel to longitudinal axis L or tapering angle A), the depth at which setting key edge 24 protrudes into mortise 12 gets progressively narrower to allow the plane iron 10 to be mounted progressively deeper, while maintaining the same desired tapering angle 16 for a consistently angled tenon 11. In one embodiment, depth of cut adjuster 14 engages setting key 2 at notch 20 and may slide it along longitudinal axis L or tapering angle A when rotated by a threaded screw, slid by a tab, or using any other sliding mechanisms.

In some embodiments, setting key 2 is removably stored into a setting key storage slot 6 of the housing body of the tapering plane 8. Setting key 2 may be nested in the setting key storage slot 6 by a piston fit, press fit or other friction or non-friction based locking mechanisms. In some embodiments, setting key 2 has a notch 20 that slides under a complementary protrusion to nestle setting key 2 into setting key storage slot 6. Setting key 2 may have a removal tab 18, such that when setting key 2 is fully inserted into setting key storage slot 6, removal tab 18 protrudes beyond the outer edge of the tapering plane 8 body. Removal tab 18 may be pulled to remove setting key 2 from setting key storage slot 6.

Once the plane iron is accurately mounted to the tapering plane, setting key 2 may be removed from mortise 12. An elongated wooden round may then be passed through mortise 12 and tapering plane 8 may be rotated perpendicular to the longitudinal axis L of the elongated wooden round. When tapering plane 8 is rotated, plane iron 10 shaves the wood round to shape it into tenon 11 cut with a desired tapering angle 16.

Figure 4:
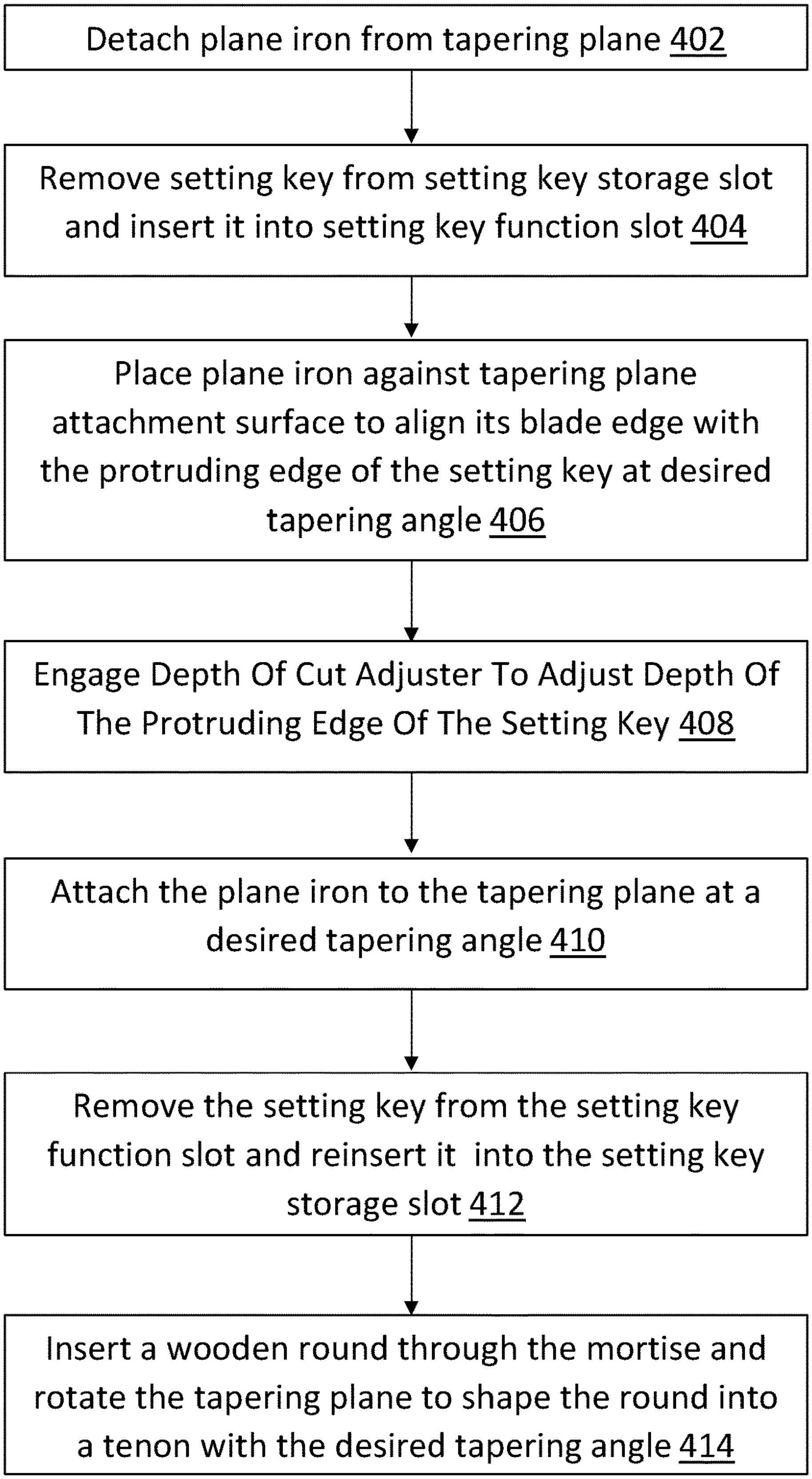
FIG. 4 is a flowchart of a method for mounting plane iron 10 to tapering plane 8 with a setting key 2, in accordance with some embodiments of the invention.

Reference is made to FIG. 4, which is a flowchart of a method for mounting plane iron 10 to tapering plane 8 using a setting key 2, in accordance with some embodiments of the invention.

In operation 402, plane iron 10 may be detached from tapering plane 8.

In operation 404, setting key 2 may be removed from setting key storage slot 6 and inserted into setting key function slot 4.

In operation 406, plane iron 10 may be placed on its attachment surface of tapering plane 8 such that the blade edge of plane iron 10 is aligned with protruding edge 24 of setting key 2 at desired tapering angle 16.

In operation 408, the depth of the protruding edge 24 of setting key 2 may be adjusted by depth of cut adjuster 14.

In operation 410, plane iron 10 may be attached to tapering plane 8 at desired tapering angle 16.

In operation 412, setting key 2 may be removed from setting key function slot 4 and reinserted into setting key storage slot 6.

In operation 414, wooden round may be inserted through mortise 12 and tapering plane 8 may be rotated relative to wooden round to shape it into a tenon 11 with the desired tapering angle 16.

Other operations may be added or some of the above operations may be omitted (e.g., operation 402 and/or 410, or using the storage slot 6 in operations 404 and 412) or executed in a different order.

Embodiments of the invention provide a system for easy and accurate blade setting for consistent and smooth tenon cuts. Setting key 2, when inserted into setting key function slot 4, ensures an even blade setting to cut across a tenon to ensure a fixed (e.g., 6 degree) tapered shape. Tapering plane may also have a convenient setting key storage slot 6 in the body of the tool to house the setting key. Tapering plane may also have a depth of cut adjuster 14 that allows for easy micro adjustment of setting key depth. This all makes removing (and replacing) the blade for sharpening an accurate and easy procedure. With a tapering plane, it is important that the blade is set evenly across the cut in order to achieve the cut necessary for accurate joinery. Embodiments of the invention provide a unique built-in setting key system on tenon cutters which allows the user to accurately set the blade in place.

To operate tapering plane, a workpiece may be placed in the entrance of the cutter and so that it is centered evenly.

Once there is an equal space around all edges, the workpiece may be turned. When a few turns are cut, the workpiece may be placed in a vice at, for example, as close to 90 degrees to the bench as possible. With a hand on either end of the tool, equal pressure may be applied and the tapering plane may be lightly turned. To cut the tenon, place your spindle through the tenon cutter to the exit point cut, and turn. The dimension of the spindle will hold the workpiece steady in the tenon cutter as you turn to your tenon length. If a deeper cut is desired, some pressure may be applied downward before making a blade adjustment for depth of cut. To finish the cut, simply float the tool upward.

The setting key slides into the slot with the notched edge down and first to enter. The notched edge interacts with the washer on the depth of cut adjustment, and can be advanced for a deeper cut, or retracted back for a lighter cut. To loosen and tighten the blade, the same tool (e.g., allen key) may be used, which is used for the depth of cut socket screw. There is a convenient storage slot in the body of the tapering plane to house the setting key and/or allen key.

In one example provided only for illustrative purposes, the tapering plane may make a six degree cut that is ⅝ of an inch at the smallest point and 15/16 of an inch at the widest. The tapering plane may cut over a length of 2 and ⅞". The tenon achieved from this plane may be long enough for a lag to go through a 2" thick seat with extra length to accommodate for rake and splay. An HSS blade may be slightly tapered at the entrance to ensure a clean shoulder of up to 1" diameter, bringing the overall length of cut to 3⅛" length. These dimensions are used only for example and other angles and dimensions may be used.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A setting key for attaching a plane iron to a tapering plane at a specific desired tapering angle, the setting key comprising:

a first edge shaped to fit into a setting key function slot with an opening along a circumference of a mortise of the tapering plane; and a second edge positioned opposite to the first edge, wherein when the setting key is inserted into the setting key function slot:

the first edge is nested in the setting key function slot, and the second edge protrudes into and radially bisects the mortise of the tapering plane, such that the second edge provides a surface spaced from the mortise edge and positioned at an orientation that differs from a longitudinal axis of the mortise by the specific desired tapering angle to hold the plane iron so that it is configured to be attached to the tapering plane at the specific desired tapering angle.

2. A tapering plane for shaping a tenon, the tapering plane comprising:

a mortise;

a plane iron;

a setting key function slot with an opening along the circumference of the mortise; and the setting key of claim 1.

3. The tapering plane of claim 2 comprising a depth of cut adjuster configured to adjust the depth of the setting key function slot, and in turn, the depth at which the second edge protrudes to hold the plane iron to be attached to the tapering plane.

4. The tapering plane of claim 3, wherein the depth of cut adjuster slides the setting key along the setting key function slot so that the depth at which the second edge protrudes into the mortise gets progressively narrower along the longitudinal axis of the mortise to allow the plane iron to be attached progressively deeper into the tapering plane.

5. The tapering plane of claim 3, wherein the depth of cut adjuster engages the setting key at a notch abutting the first edge to slide the setting key along the setting key function slot.

6. The tapering plane of claim 2 comprising a setting key storage slot to removably store the setting key in a housing body of the tapering plane.

7. The tapering plane of claim 6, wherein the setting key comprises a notch configured to slide under a complementary protrusion in the housing body of the tapering plane to nestle the setting key into the setting key storage slot.

8. The tapering plane of claim 6, wherein the setting key comprises a removal tab, such that when the setting key is fully inserted into the setting key storage slot, the removal tab protrudes beyond the outer edge of the housing body of the tapering plane.

9. The setting key of claim 1, wherein the first and second edges are parallel, and the key function slot is non-parallel to the longitudinal axis of the mortise differing therefrom by the desired tapering angle, so, when the setting key is inserted into the setting key function slot, the second edge is angled from the longitudinal axis of the mortise by the specific desired tapering angle.

10. The setting key of claim 1, wherein the first edge and second edge are non-parallel, differing by the specific desired tapering angle, so, when the setting key is inserted into the setting key function slot, the first edge aligns parallel to the longitudinal center axis of the mortise, and the second edge is angled from the longitudinal center axis of the mortise by the specific desired tapering angle.

11. The setting key of claim 1, wherein the first and second edges and setting key function slot are all non-parallel to the longitudinal center axis of the mortise, each angled therefrom by an angle which when combined causes the second edge to angle from the longitudinal center axis of the mortise by the specific desired tapering angle.

12. A method for mounting a plane iron to a tapering plane at a specific desired tapering angle using a setting key, the method comprising:

inserting the setting key into a setting key function slot that has an opening along a circumference of a mortise of the tapering plane, such that a first edge of the setting key is nested in the setting key function slot, and a second edge of the setting key, positioned opposite to the first edge, protrudes into and radially bisects the mortise of the tapering plane, such that the second edge provides a surface spaced from the mortise edge and is positioned at an orientation that differs from a longitudinal axis of the mortise by the specific desired tapering angle;

placing a cutting edge of the plane iron to align with the second edge of the setting key so that the plane iron is oriented at the specific desired tapering angle relative to the longitudinal axis of the mortise of the tapering plane; and attaching the plane iron to the tapering plane at the specific desired tapering angle.

13. The method of claim 12 comprising detaching the plane iron from the tapering plane.

14. The method of claim 12 comprising removing the setting key from a setting key storage slot.

15. The method of claim 12 comprising engaging a depth of cut adjuster to adjust the depth of the setting key function slot, and in turn, the depth at which the second edge protrudes into the mortise to attach the plane iron at a desired depth to the tapering plane.

16. The method of claim 15, wherein engaging the depth of cut adjuster slides the setting key along the setting key function slot so that the depth at which the second edge protrudes into the mortise gets progressively narrower along the longitudinal axis of the mortise so that the plane iron is held for attachment progressively deeper into the tapering plane.

17. The method of claim 12 comprising removing the setting key from the setting key function slot.

18. The method of claim 12 comprising inserting the setting key into a setting key storage slot.

19. The method of claim 12 comprising:

inserting a wooden round through the mortise; and rotating the tapering plane to shape the wooden round into a tenon with the specific desired tapering angle.

* * * * *